United States Patent
Shah et al.

(10) Patent No.: US 11,934,785 B2
(45) Date of Patent: Mar. 19, 2024

(54) MULTI-TASK LEARNING OF QUERY INTENT AND NAMED ENTITIES

(71) Applicant: Target Brands, Inc., Minneapolis, MN (US)

(72) Inventors: Shalin Shah, Sunnyvale, CA (US); Ryan Siskind, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 327 days.

(21) Appl. No.: 17/509,868

(22) Filed: Oct. 25, 2021

(65) Prior Publication Data

US 2022/0129633 A1   Apr. 28, 2022

Related U.S. Application Data

(60) Provisional application No. 63/105,043, filed on Oct. 23, 2020.

(51) Int. Cl.
*G06F 40/295* (2020.01)
*G06F 40/35* (2020.01)
*G06N 3/04* (2023.01)

(52) U.S. Cl.
CPC ............ *G06F 40/295* (2020.01); *G06F 40/35* (2020.01); *G06N 3/04* (2013.01)

(58) Field of Classification Search
CPC .......... G06F 40/295; G06F 40/35; G06N 3/04
See application file for complete search history.

(56) References Cited

U.S. PATENT DOCUMENTS

| 9,454,957 B1 | 9/2016 | Mathias et al. |
| 9,558,740 B1 | 1/2017 | Mairesse et al. |
| 10,304,444 B2 | 5/2019 | Mathias et al. |

(Continued)

FOREIGN PATENT DOCUMENTS

| CA | 3142624 A1 * | 12/2020 | ......... G06F 16/3329 |
| CN | 107526798 B * | 9/2020 | ............. G06F 16/35 |

(Continued)

OTHER PUBLICATIONS

Zukov-Gregoric, Andrej, et al. "Neural named entity recognition using a self-attention mechanism." 2017 IEEE 29th international conference on tools with artificial intelligence (ICTAI). IEEE. (Year: 2017).*

(Continued)

*Primary Examiner* — Daniel C Washburn
*Assistant Examiner* — Oluwadamilola M Ogunbiyi
(74) *Attorney, Agent, or Firm* — Merchant & Gould P.C.

(57) ABSTRACT

Methods and systems for performing multi-task learning of query intent and named entities are provided. One method includes receiving a query comprising query text. The method further includes providing the query text to a neural network model implemented on a computing system, the neural network model having a plurality of layers, wherein at least one layer comprises a plurality of loss functions including a named entity tag learning loss function and an intent classification loss function. The method also includes obtaining, from the neural network model, an identification of a named entity and a query intent derived from the query text. A query response may be formulated based, at least in part, on the named entity and query intent.

20 Claims, 6 Drawing Sheets

(56) References Cited

U.S. PATENT DOCUMENTS

| | | | |
|---|---|---|---|
| 2018/0052842 A1 | 2/2018 | Hewavitharana et al. | |
| 2018/0144385 A1* | 5/2018 | Subramanya | G06N 3/08 |
| 2019/0012390 A1* | 1/2019 | Nishant | G06N 3/006 |
| 2020/0184339 A1* | 6/2020 | Li | G06N 3/047 |
| 2020/0234088 A1* | 7/2020 | Taha | G06V 10/764 |
| 2020/0380402 A1* | 12/2020 | Scott | G06N 3/08 |
| 2020/0382480 A1* | 12/2020 | Isaacson | G06Q 30/0641 |
| 2021/0118545 A1* | 4/2021 | Sathyanarayana | G06N 20/20 |
| 2021/0149963 A1* | 5/2021 | Agarwal | G06F 16/90332 |
| 2022/0100746 A1* | 3/2022 | Chen | G06F 18/2148 |

FOREIGN PATENT DOCUMENTS

| | | | |
|---|---|---|---|
| CN | 111831901 A * | 10/2020 | |
| CN | 114996422 A * | 9/2022 | |
| WO | WO-2021118462 A1 * | 6/2021 | G06F 40/30 |
| WO | WO-2021147726 A1 * | 7/2021 | G06F 16/35 |
| WO | WO-2021179483 A1 * | 9/2021 | G06K 9/6277 |

OTHER PUBLICATIONS

Zou, Junyi, Jinliang Zhang, and Ping Jiang. "Credit card fraud detection using autoencoder neural network." arXiv preprint arXiv: 1908.11553. Retrieved from <https://arxiv.org/ftp/arxiv/papers/1908/1908.11553.pdf> on Nov. 8, 2023. (Year: 2019).*

Chen, Qian, Zhu Zhuo, and Wen Wang. "Bert for joint intent classification and slot filling." arXiv preprint arXiv:1902.10909. Retrieved from <https://arxiv.org/pdf/1902.10909.pdf> on Nov. 8, 2023. (Year: 2019).*

Zhu, Qiuyu, et al. "Improving classification performance of softmax loss function based on scalable batch-normalization." Applied Sciences 10.8: 2950. Retrieved from <https://www.mdpi.com/2076-3417/10/8/2950> on Nov. 9, 2023. (Year: 2020).*

Mohan, Deepa, Walmart Global Tech: Joint Intent Classification and Entity Recognition for Conversational Commerce (Dec. 11, 2019); 5 Pages.

Ma et al., Jointly Trained Sequential Labeling and Classification by Sparse Attention Neural Networks (Sep. 28, 2017); 5 Pages.

Ben Lutkevich, BERT Language Model, Search Enterprise AI (Jan. 2020), https://searchenterpriseai.techtarget.com/definition/BERT-language-model; 4 Pages.

Sebastian Ruder, An Overview of Multi-Task Learning in Deep Neural Networks (May 29, 2017); 14 Pages.

Castellucci et al., Multi-lingual Intent Detection and Slot Filling in a Joint BERT-based Model (Jul. 2019); 10 Pages.

Peng et al., An Empirical Study of Multi-Task Learning on BERT for Biomedical Text Mining (Jul. 9, 2020); 10 Pages.

E et al., A Novel Bi-directional Interrelated Model for Joint Intent Detection and Slot Filling (Jun. 2019); 5 Pages.

Weld et al., A Survey of Joint Intent Detection and Slot-Filling models in Natural Language Understanding (Feb. 2021); 32 Pages.

* cited by examiner

| Query | Buy | An | Orange |
|---|---|---|---|
| NER Labels | <O> | <O> | <O> |
| Intent Labels | 0 | 0 | 0 |
| Model Output (Intent) | -0.22 | -0.02 | -0.22 |

| Query | Orange | Target | Store |
|---|---|---|---|
| NER Labels | <STORE> | <O> | <O> |
| Intent Labels | 1 | 1 | 1 |
| Model Output (Intent) | 0.57 | 0.34 | 0.31 |

MULTI-TASK LEARNING OF QUERY INTENT AND NAMED ENTITIES

CROSS-REFERENCE TO RELATED APPLICATIONS

The present application claims priority from U.S. Provisional Patent Application No. 63/105,043, filed on Oct. 23, 2020, the disclosure of which is hereby incorporated by reference in its entirety.

BACKGROUND

Named Entity Recognition (NER) is used to locate and classify named entities (e.g., known objects) in unstructured text. However, Named Entity Recognition tasks may occur within other contexts. For example, in the context of a received query, there is also a problem of determining query intent.

This issue of determining both a named entity and a query intent may arise in the context of a retail website. For example, if a particular store name or location is included in the query, the store name/location may be identified using Named Entity Recognition, but such NER techniques may not also identify why information about that store is sought (e.g., to determine hours, location, stock levels, or some other type of information is sought). Traditionally, these tasks are managed and analyzed separately as to the same query text. Nevertheless, improvements in determining query intent concurrently with recognizing named entities are desirable, to improve accuracy and responsiveness.

SUMMARY

In examples, both intent and named entities may be determined from query text using a neural network model that includes a named entity tag learning loss function and an intent classification loss function that otherwise share the remaining layers in the model. An intent being detected in the query text may result in overall scores for query text to be affected, allowing for improved identification of named entities based on being informed from intent. This may be used, for example, in tagging text such as query text, and generating query responses based on the tagging of named entities.

In one example aspect, a method includes receiving a query comprising query text. The method further includes providing the query text to a neural network model implemented on a computing system, the neural network model having a plurality of layers, wherein at least one layer comprises a plurality of loss functions including a named entity tag learning loss function and an intent classification loss function. The method also includes obtaining, from the neural network model, an identification of a named entity and a query intent derived from the query text.

In a second aspect, a system includes a programmable circuit and a memory. The memory stores computer-executable instructions which, when executed by the programmable circuit, cause the system to: provide query text received at a retail website to a named entity recognition model implemented on a computing system, the neural network model comprising a neural network having a plurality of layers, wherein at least one layer comprises a plurality of loss functions including a named entity tag learning loss function and an intent classification loss function; obtain, from the neural network model, an identification of a named entity and a query intent derived from the query text; and return, via the retail website, a response to the query text in accordance with the query intent and based, at least in part, on the identification of the named entity.

In a third aspect, a retail search system includes a web server hosting a retail website, and a query processing system communicatively connected to the web server to receive query text received at the web server from a hosted website. The query processing system includes a neural network model having a plurality of layers, wherein at least one layer comprises a plurality of loss functions including a named entity tag learning loss function and an intent classification loss function, and an entity extraction component configured to receive query intents and identify one or more named entities from the query text. The query processing system further includes a response generation component configured to, based on the query intents and the one or more named entities, generate a response to the query text and provide the response to the web server.

BRIEF DESCRIPTION OF THE DRAWINGS

The same number represents the same element or same type of element in all drawings.

FIGS. 4A-4B illustrates tables showing named entity labels, intent labels, and model outputs, in accordance with two different queries.

DETAILED DESCRIPTION

As briefly described above, embodiments of the present invention are directed to methods and systems for determining query intent and named entities in response to a query, for example using multi-task learning in conjunction with an appropriate named entity recognition model.

In accordance with this disclosure, example embodiments are directed joint learning of task-specific Named Entity Recognition with a text classification loss function to obtain both a named entity and query intent. For example, multitask transfer learning may be applied to a particular NER algorithm, such as the Bidirectional Encoder Representations from Transformers (BERT) pre-trained convolutional neural network. In some instances, a plurality of loss functions may be added to the final layers, and shared labels may be used across words in a query to provide transfer learning to the BERT algorithm. In such instances, precision regarding the NER and query intent results may improve by ~3% over standard BERT systems.

Such a system may be utilized to classify specific queries that can be received, for example, at a website of a retailer. In that context, a user may query the retailer as to a particular brand or item, or as to a particular store location or other specific named entity. However, the query may also relate to some other aspect of that entity (e.g., in the case of a store location, the store location hours, stock levels, contact information, or other information may be requested). Accordingly, by more accurately determining the named object and the intent of the query, result accuracy in response to a given query can be improved, thereby improving the user experience when visiting the retailer website.

In example use cases, a user may input a query through an application or web page accessed via a web browser executing on the user's device, where the application or web page is associated with a service (e.g., an online retail service). The query may take the form of voice or text based query message including a plurality of words, and can be received at a remote server hosting the service. The query may be provided to a natural language processing (NPL) system for processing to generate a query response to transmit back to the user's device.

Figure 1:
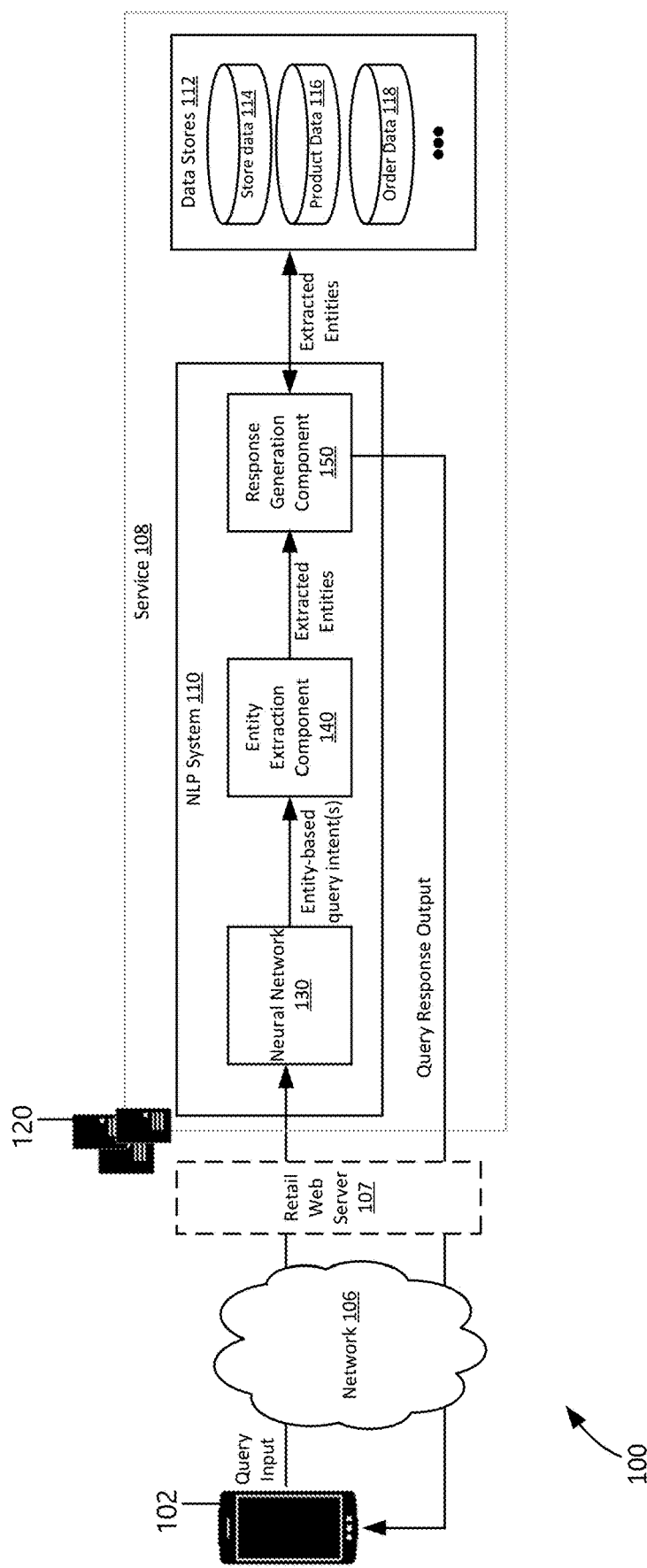
FIG. 1 illustrates an example system in which learning of query intent and named entities may be performed concurrently, for example using multitask learning.

Referring first to FIG. 1, an example system 100 is shown in which aspects of the present disclosure may be implemented. In the example shown, the system 100 includes a user device 102 which may be configured to generate text input for classification. In the example as seen, the text input takes the form of a query input.

The query input is provided, via a network 106, to a service 108. The service 108 may generally be used to respond, at least in part, to receive text such as query text. In the example shown, the query is received and forwarded to the surface 108 by a retail web server 107. The retail web server 107 may host a retail website that has search functionality, and may provide access to such a website to the user device 102 via the network 106. The network 106 may include, among other aspects, a variety of public and/or private networks, including the Internet.

In general, the service 108 includes a natural language processing system 110 communicatively coupled to a plurality of data stores 112. The natural language processing system 110 includes a neural network 130, and entity extraction component 140, and a response generation component 150. Generally speaking, the natural language processing system 110 may receive text input, such as query input, and return a response based on, among other aspects, and intent of a query as well as any entities identifiable within the query.

The neural network 130, described further below in conjunction with FIG. 2, may be constructed and trained to identify a query intent, as well as to identify named entities within received query text. The entity extraction component 140 may then extract specific entities based on scored query text received from the neural network. The response generation component 150 may use the determined intent and extracted entities to generate a response to the query. The response generation component 150 may do so by obtaining data from the data stores 112 that are relevant to the extracted entities and responsive to the query intent. Examples of such response generation are provided in further detail below.

The data stores 112 may include a variety of enterprise data, including store data 114, product data 116, and order data 118. The store data 114 may include information about store locations, hours, the departments, etc. The product data 116 may include information about products carried by the retailer and offered for sale at the retail website provided by web server 107. The order data 118 may include information about past orders, as well as various other types of orders such as order registries, gift registries, etc. Other types of data may be retained within the data stores 112 as well.

Figure 2:
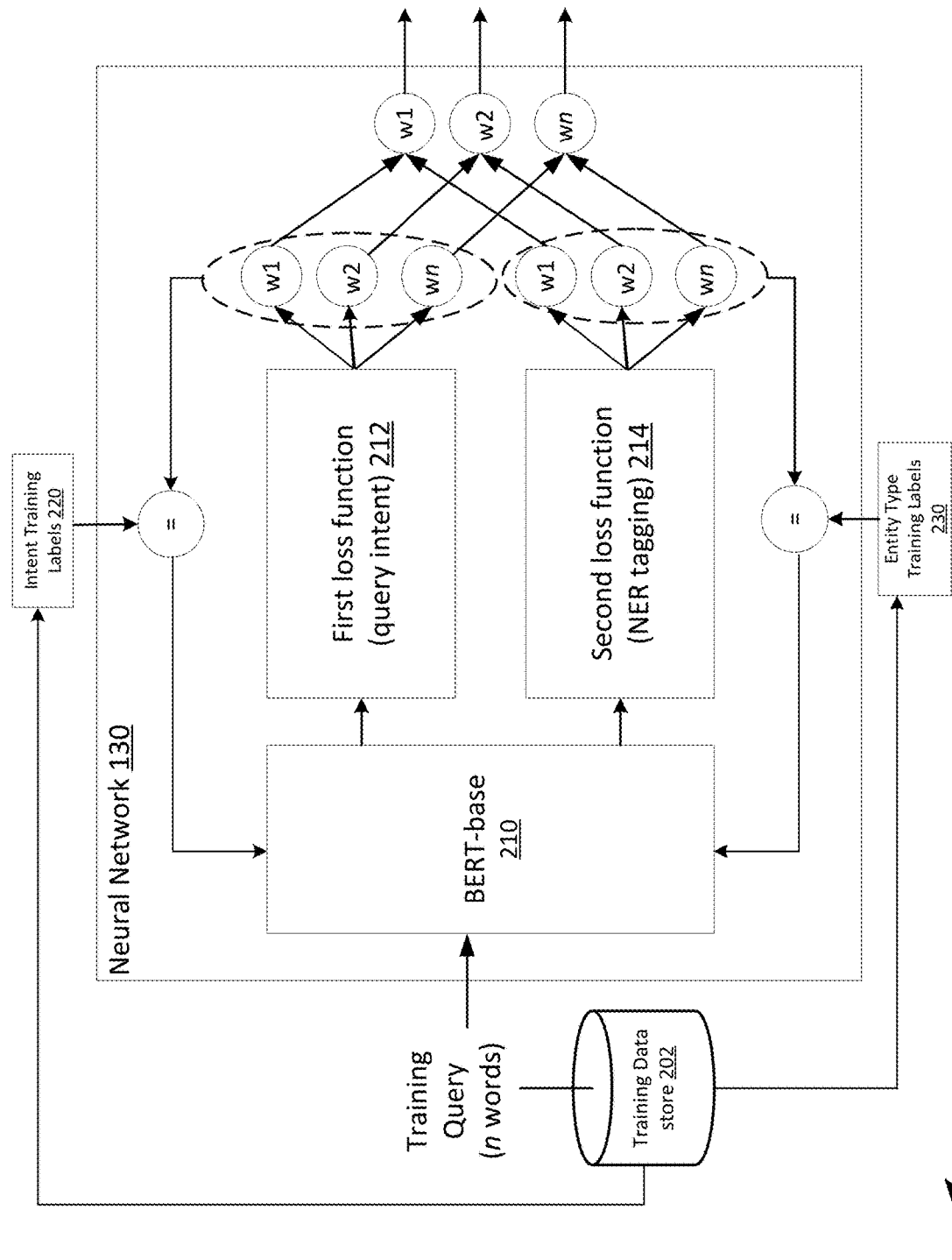
FIG. 2 illustrates an example model structure for a multitask learning neural network model usable to concurrently determine query intent and named entities.

Referring now to FIG. 2, a neural network subsystem 200 is illustrated, including neural network 130 of FIG. 1. In the example shown, the neural network subsystem 200 includes a training data store 202 that provides training data to the neural network 130, including training queries (text strings of n words in length), as well as both intent training labels 220 and entity training labels 230.

Overall, the multi-task learning of query intent and named entities using transfer learning described herein is performed by the neural network 130 of the NLP system 110, to predict the likelihood of the entity-based query intents. In example embodiments, the neural network 130 comprises a Bidirectional Encoder Representations from Transformer (BERT)-base model 210 and two loss functions 212, 214. Generally speaking, the BERT-base model 210 corresponds to a pre-trained convolutional neural network (CNN) model having a plurality of layers. In example embodiments, at least some of the plurality of layers in the BERT-base model 210 may correspond to linear layers.

The BERT-base model 210 may be a pre-trained model having one or more embedding layers that receives a query (in the form of query text) as input and generates a vector representation for each of n words comprising the query. The vector representation for each of then words may be received as input to each of the loss functions.

The first loss function 212 is a named entity recognition (NER) tagging loss function and the second loss function 214 is a query intent loss function. In some examples, the named entity recognition (NER) tagging loss function can be implemented using Softmax loss, which classifies each word of a query into an entity type. Example entity types may include a store, a product, an order name, an order number, etc. The output of the loss functions may be a score (e.g., between −1 and +1) representing a likelihood of each of the n words of query being associated with the particular entity-based intent. The Softmax loss may be expressed as:

$$Softmax_i = \frac{\exp(x_i)}{\sum_{j=1}^{n} \exp(x_j)}$$

where n corresponds to a number of words included in a given set of query text. In alternative examples, the query intent loss function may be implemented as a linear loss function layer.

In some example embodiments, the Softmax loss function may be used in conjunction with an existing library that includes pre-trained models for named entity recognition. One such example is the HuggingFace library. Other libraries may be used as well.

The second loss function 214 uses a set of shared labels for each of the words included in query text. For example, if a number of words in a query is n, and if the intent of the query is known, then each word in the query may be labeled with a predetermined value (e.g., given a value of "1"). If the intent of the query is not known, then each word and query may be labeled with a different predetermined value (e.g., given a value of "0"). The use of identical labels for each word in the query provides that, during inference, each word would otherwise have its own intent. Because the intent is shared by all words in a query, using shared labels improves the precision and F-1 score (accuracy) for the query, as seen in examples below.

To train the neural network, training queries may be retrieved from a training data store 202, and provided as input to the neural network 130. Each of the training queries include the NER and intent labels, including for at least one query intent label 220 and at least one named entity label 230 recognized for the query.

In example implementations, there are distinct forward and backward passes through the neural network 130 for the cost functions associated with the final layers. In some example embodiments, a single forward and backward pass is performed. In others, two or more forward-backward passes may be performed (e.g., one backward pass for each loss function) to determine error. The error may be utilized to adjust weights within the embedding layers of the BERT-base model. All entity-based intent types may be trained at once. The passes are performed separately, and sequentially, for the two different loss functions. In some examples, a learning rate for the global intent loss function is set at a factor of 0.1. Other learning rates may be implemented as well. Notably, this intent loss is shared during the backward pass through to the shared players preceding the second loss function 214, but during the forward pass, each word of the query will have its own intent score. Accordingly, the model will generate both an intent value that is common among all query words and an intent score that is unique to each word.

Once trained, the neural network 130 may generate scores, as well as may append intent and NER labels, given query text. Each word (designated as words W1, W2, ... Wn) within the query text will be scored by each loss function, and a combined resultant output score is provided. The score may be used (either by the neural network 130 itself, or by an entity extraction component 140 downstream of the neural network 130 following generation of the scores) to determine appropriate labels to be applied as to both query intent and any named entities that should be identified within the text. as illustrated in the example below. Accordingly, the neural network 130 and/or downstream entity extraction component 140 may generate, for each word in query text, a named entity label, and intent label, and a combined model output score which represents an entity based intent reflected in the overall query text.

Figure 3:
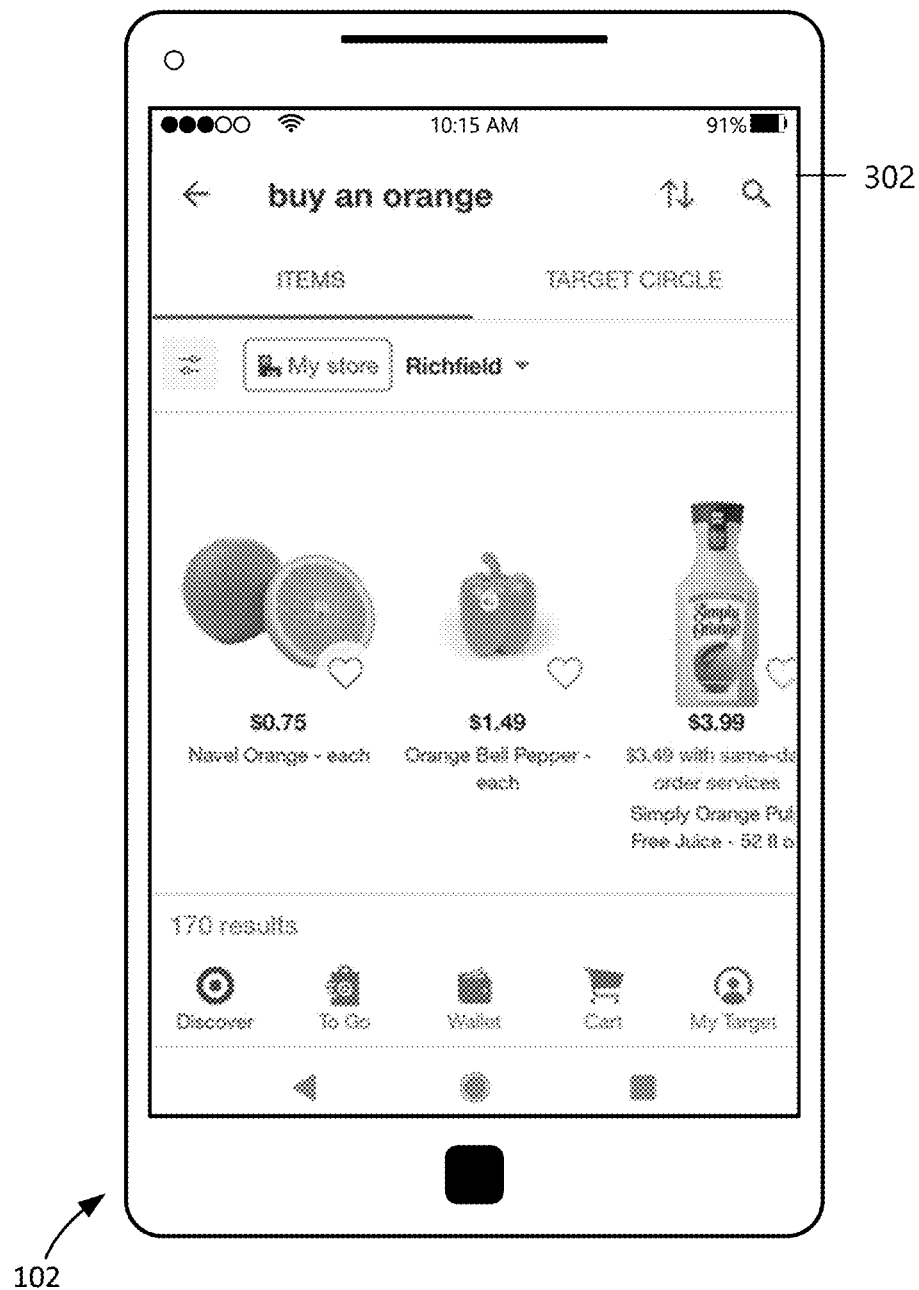
FIG. 3 illustrates an example query and response, received via a retail website, in accordance with an example application of the multitask learning described herein.

Referring now to FIG. 3 and FIGS. 4A-4B, example queries and model scoring for such queries are illustrated in the context of a retail website. A user device, such as user device 102, may receive query text within a user interface 302 of the user device 102. FIG. 3 illustrates one example query text, "Buy an Orange" and associated responsive results. However, the output of the neural network 130 described above is illustrated in FIGS. 4A-4B associated with two different queries, both "Buy an Orange" and "Orange Target Store". In the examples described herein, the named entities correspond to specific store locations. However, in other examples, other types of entities may be utilized as well.

In the example of FIG. 3, the user interface 302 displays a region for inputting query text, as well as a region for displaying results. In the case of query text "Buy an Orange", a set of results illustrating product information may be displayed. The product information may be displayed based on the named entity extraction process which labels particular words with entity types, as well as an intent associated with those entities. Here, because no particular store location is identified in the query text, no entity is identified by the entity extraction component 140, and a response may be provided that is specific to item data, e.g., retrieved from the product data 116 rather than store data 114 or order data 118 by the response generation component 150 (again, since no extracted entity is determined). In this instance, the response generation component 150 may be configured to default to present product data when no other intent is present.

Operation of the NLP system 110 may change, however, based on receipt of a different query. As seen in FIGS. 4A-4B, example tables 400, 420 outputs from the neural network 134 the two queries "Buy an Orange" and "Orange Target Store" are shown. Table 400 corresponds to the query "Buy an Orange" while table 420 corresponds to the query "Orange Target Store".

As seen in tables 400, 420 below, each query will generate an intent score for each word within the query. In table 400, the intent scores for "Buy an Orange" are relatively low for each word, indicating a low intent to identify a location. This low intent may result in a classification of intent as "0" for each word, and not identifying any named entities using a named entity classifier.

However, in table 420, the intent scores generated by the neural network 130 are significantly higher. Accordingly, that text may be provided to a named entity classifier, such as entity extraction component 140, which identifies the word "Orange" as corresponding to a particular store location, and assigns a <store> tag to that word, with null tags assigned to other words that do not correspond to named entities. Additionally, because the intent scores are higher, the intent labels may be applied in a shared manner across all words in the query text.

By comparison between tables 400, 420, the store lookup-based intent scores for the "Buy an Orange" query outputs by the neural network 130 are all negative, representing a low likelihood that the intent of that query is for store lookup. The store lookup-based intent scores for the "Orange Target Store" query that are output by the neural network 1230 are positive and of higher values for all three words representing a likelihood that the intent of the first query is for store lookup.

Referring back to the tagging process seen in Tables 400, 420, to determine what scores result in specific tagging or classification processes, the scores output by the trained neural network 130 may be compared to a threshold value to determine if the likelihood of each of the n words of the query being associated with the particular entity-based intent (e.g., a store lookup intent) is sufficient to proceed to entity extraction. If the scores exceed the threshold value, then an identification and extraction of the entity is performed. For example, based on the store look-up intent reflected in the scores in Table 420 (being above a predetermined threshold, for example having one or more scores above 0.3 or 0.5, a value tunable for accuracy), the entity (e.g., the store) identified and extracted is the "Orange" store. One or more data stores may then be queried to retrieve information associated with the extracted "Orange" store for use in populating the query response. Such a different query response may correspond to providing store hours, store location, for other details regarding the particular identified store that was tagged in the query text.

Figure 5:
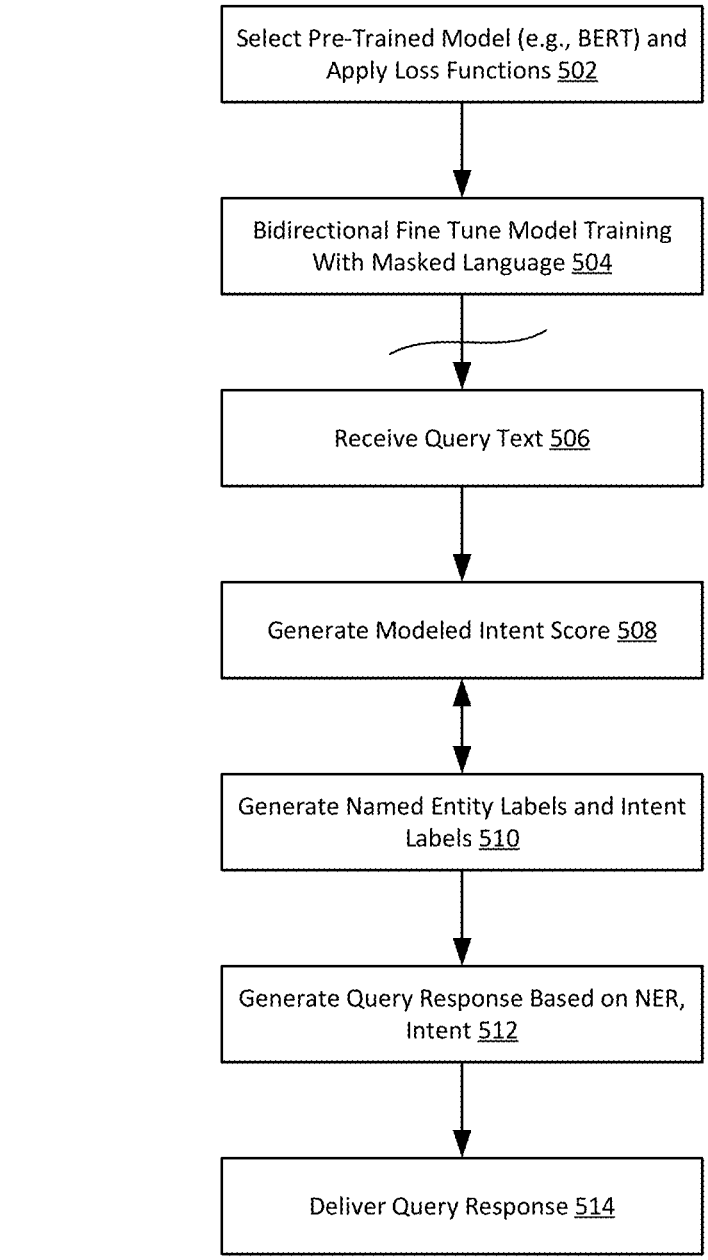
FIG. 5 is a flowchart of a method for determining query intent and performing named entity recognition using a shared model and multitask learning, according to an example embodiment.

Referring now to FIG. 5, an example method 500 for determining query intent and performing named entity recognition using a shared model and multitask learning is shown. The method includes selecting a model, and applying loss functions at a last layer of that model (step 502). As noted above, in some examples the model corresponds to a BERT model, i.e. a particular pre-trained convolutional neural network. The loss functions can include a first function directed to named entity recognition, and a second function directed to query intent.

The method 500 further includes performing a training process on the model, in particular a bidirectional fine tuning using particular masked language as data sets (step 504). In particular, the training data may include query texts having n words, and being labeled both with a query intent for each word as well as labels directed to named entities included within the query text. The training process, as described above in conjunction with FIG. 2, is bidirectional, and propagates intent back through the earlier linear layers of the neural network to allow intent to inform the identification of named entities.

Once the model is trained, it may be used in named entity classification and query intent determination processes. Specifically, in the context of query processing such as at a retail website) the method 500 may include receiving query text (step 506). The query text may be received, and may have any of a variety of intense associated with it, such as searching for information about an item available to purchase, searching for information about a store identified as a named entity within the query text, or searching for information about gifting based on a determination of a gifting intent from the query text.

In the example shown, the method 500 further includes generating a modeled intent score for each word within the query (step 508). From the modeled intent score for each word, it can be determined whether an intent exists for the overall query. If the intent exists (for example based on scores being above a predetermined, or tunable threshold), intent labels may be applied to each of the words in the query text, and named entities may be identified within the query text as well using a named entity classifier (step 510). Accordingly, named entities are identified more accurately, based on the fact that they reside within query text having an appropriate context for that named entity.

In the example shown, the method 500 can further include generating a query response based on the classified named entities and the intent associated with the query text (step 512). For example, the query response may correspond to, as above, providing specific store information, providing specific item information, providing order information, providing gift information, or other examples. Once a query response is generated, that response may be delivered to the query submitting entity, such as a user device 102 as described above (step 514). The query response may be delivered in the form of search results, or other contextual information provided to the user identifying the particular named entity and providing results responsive to the query intent (e.g., not providing information about oranges for purchase when a query is received directed to the Orange, CA store location).

Referring to FIGS. 1-5 generally, it is noted that the multitask approach described herein, using two loss functions for the intent and named entity recognition classification tasks, can have an effect of improving precision and F-1 score (accuracy) on a given dataset. Using a retail-specific dataset and using the store location intent as the specific intent to be detected, and using a 20% hold back test set, the multitask approach described above reflects a 3% improvement in precision and a slight improvement in accuracy relative to a base BERT model, as seen in Table 1 below.

TABLE 1

Comparison of Test Results between BERT and BERT with Multitask Learning

| Algorithm | Precision | Recall | F-1 Score (Accuracy) |
| --- | --- | --- | --- |
| BERT - Multitask | 94% | 79% | 0.86 |
| BERT (standard) | 91% | 80% | 0.85 |

Over a very large-scale dataset of possible queries that may be received by a large-scale retailer, as well as the large number of named entities that may be included within such queries, even a 3% improvement in precision (i.e., a reduction in false positives, primarily) reflects significant change in responsiveness to queries, and savings in terms of computation time and/or alternative searching that would otherwise need to be performed to retrieve corrected query results.

Overall, as can be seen from these results, learning the intent of a query in conjunction with NER tagging, from the entity type training labels 230, results in a hierarchical model that reduces the false positive rate. Additionally, learning the query intent from intent training labels 220 jointly with NER will change the representation (e.g., the neural network) for NER tagging, resulting in increased precision. Further, in this multi-task problem, the inductive bias of a classifier is shared between multiple objectives, which results in an amortized classifier that only differs in the final layers resulting in an improved performance because of the global to local transfer. Specifically, the global information for a query (the query intent), and the word specific local information (the NER tags) are jointly learned, while sharing the entire BERT-base model 210.

Additionally, while discussed generally in the context of queries and query results, the above text classification process may be performed in a variety of other areas. For example, a task for which text classification precedes tagging may benefit from such approaches. As described above, identification of a shopping or item information task may be used in one example, and requesting store information may be another possible application. However, a model may be trained to learn the intent of gifting, such that tagging a gift within a query having that gifting intent would be possible. Other intents may be used as well, in a manner consistent with the present disclosure.

Figure 6:
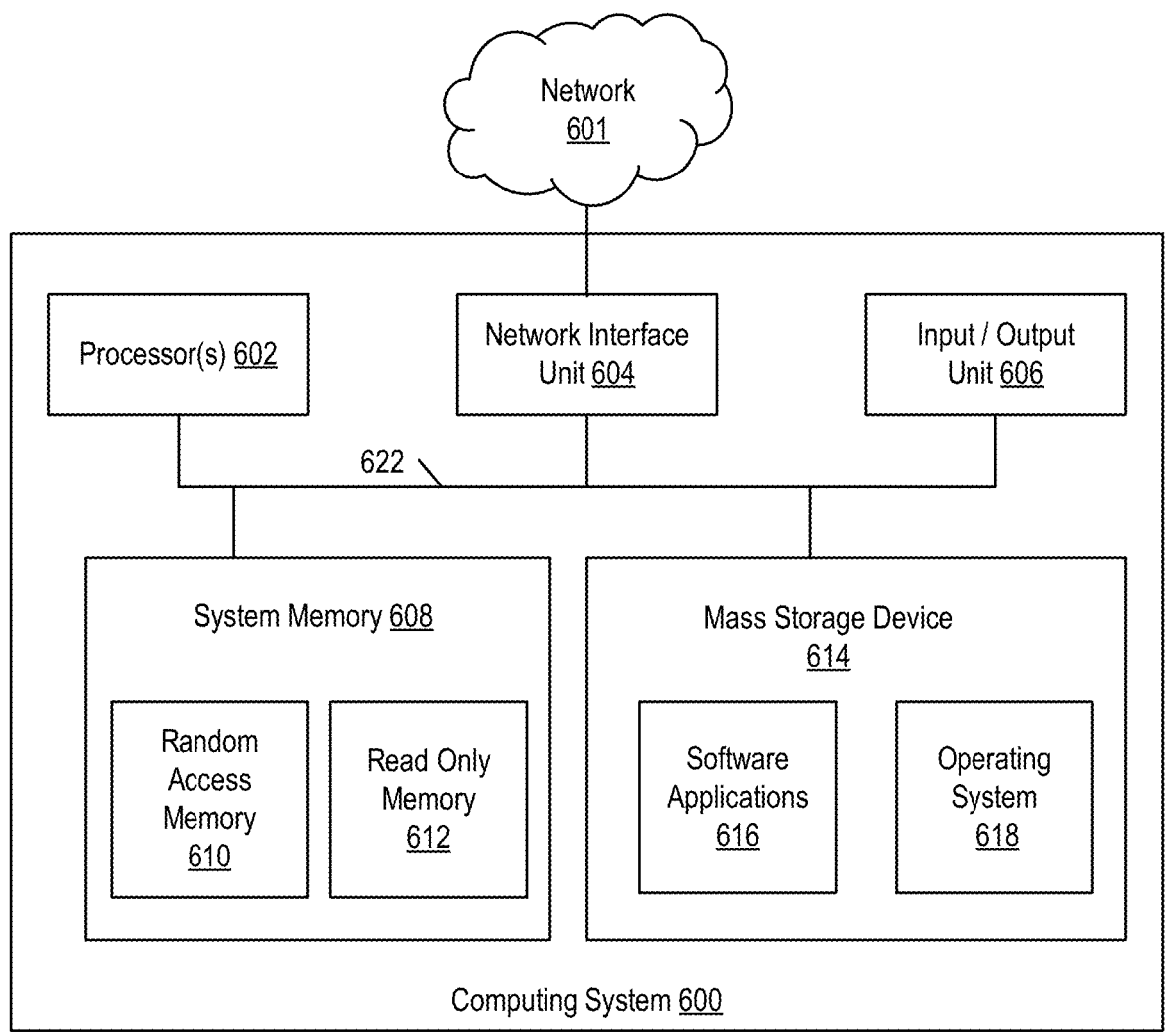
FIG. 6 illustrates an example computing system with which aspects of the present disclosure may be implemented.

FIG. 6 illustrates an example block diagram of a virtual or physical computing system 600. One or more aspects of the computing system 600 can be used to implement the processes described herein.

In the embodiment shown, the computing system 600 includes one or more processors 602, a system memory 608, and a system bus 622 that couples the system memory 608 to the one or more processors 602. The system memory 608 includes RAM (Random Access Memory) 610 and ROM (Read-Only Memory) 612. A basic input/output system that contains the basic routines that help to transfer information between elements within the computing system 600, such as during startup, is stored in the ROM 612. The computing system 600 further includes a mass storage device 614. The mass storage device 614 is able to store software instructions and data. The one or more processors 602 can be one or more central processing units or other processors.

The mass storage device 614 is connected to the one or more processors 602 through a mass storage controller (not shown) connected to the system bus 622. The mass storage device 614 and its associated computer-readable data storage media provide non-volatile, non-transitory storage for the computing system 600. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 600.

According to various embodiments of the invention, the computing system 600 may operate in a networked environment using logical connections to remote network devices through the network 601. The network 601 is a computer network, such as an enterprise intranet and/or the Internet. The network 601 can include a LAN, a Wide Area Network (WAN), the Internet, wireless transmission mediums, wired transmission mediums, other networks, and combinations thereof. The computing system 600 may connect to the network 601 through a network interface unit 604 connected to the system bus 622. It should be appreciated that the network interface unit 604 may also be utilized to connect to other types of networks and remote computing systems. The computing system 600 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the computing system 600 can store software instructions and data. The software instructions include an operating system 618 suitable for controlling the operation of the computing system 600. The mass storage device 614 and/or the RAM 610 also store software instructions, that when executed by the one or more processors 602, cause one or more of the systems, devices, or components described herein to provide functionality described herein. For example, the mass storage device 614 and/or the RAM 610 can store software instructions that, when executed by the one or more processors 602, cause the computing system 600 to receive and execute managing network access control and build system processes.

Referring to FIGS. 1-6 generally, the disclosed computing system provides a physical environment with which aspects of the named entity recognition and query intent determination may be performed. Specifically, a multi-tasking BERT-based named entity recognition algorithm is disclosed which does task-specific NER. Task-specific NER, in the context of a retail enterprise, can refer to identifying store lookup intent with the store name. By using two loss functions, and different forward and backward passes, the precision in identifying both named entities and query intent is improved. Additional improvements may be realized, for example, by tuning loss rate parameters used in training, as well as by tuning a threshold at which intents are recognized within the query text.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method comprising:
receiving a query comprising query text;
providing the query text to a neural network model implemented on a computing system, the neural network model having a plurality of layers, wherein at least one layer comprises a plurality of loss functions including a named entity tag learning loss function and an intent classification loss function;
obtaining, from the neural network model, an identification of a named entity and a query intent derived from the query text.

2. The method of claim 1, wherein the neural network model comprises a Bidirectional Encoder Representations from Transformers (BERT) model.

3. The method of claim 2, wherein a final one or more layers of the BERT model is replaced with the plurality of loss functions, and wherein the named entity tag learning loss function comprises a Softmax loss function.

4. The method of claim 3, wherein the Softmax loss function classifies each word of the query text into an entity type, and the Softmax loss function is expressed as:

$$Softmax_i = \frac{\exp(x_i)}{\sum_{j=1}^{n} \exp(x_j)}$$

wherein n is a number of words in the query text.

5. The method of claim 1, wherein each word in the query text is assigned a named entity label and an intent label, and wherein the neural network model outputs an intent score for each word in the query text.

6. The method of claim 5, wherein each intent score associated with the query text is used to determine an overall query intent associated with the query text.

7. The method of claim 1, wherein the query intent is shared across each of a plurality of words of the query.

8. The method of claim 7, wherein the query intent includes an intent selected from among: product search, retail store lookup, or gifting.

9. The method of claim 1, further comprising generating a response to the query based at least in part on the intent and any named entity identified in the query text by the named entity recognition model.

10. The method of claim 1, wherein the identification of the named entity includes an identification of an object identified by a word or phrase included in the query text, the word or phrase comprising less than the entire query text.

11. The method of claim 1, wherein the query is received as at least one of a voice query or a text query.

12. The method of claim 1, wherein the classification loss function uses shared labels across each of a plurality of words included in the query.

13. The method of claim 1, wherein the intent classification loss function uses a learning rate of 0.1.

14. A system comprising:
a programmable circuit; and
a memory storing computer-executable instructions which, when executed by the programmable circuit, cause the system to:
provide query text received at a retail website to a named entity recognition model implemented on a computing system, the neural network model comprising a neural network having a plurality of layers, wherein at least one layer comprises a plurality of loss functions including a named entity tag learning loss function and an intent classification loss function;
obtain, from the neural network model, an identification of a named entity and a query intent derived from the query text; and
return, via the retail website, a response to the query text in accordance with the query intent and based, at least in part, on the identification of the named entity.

15. The system of claim 14, wherein the neural network model is trained using a forward pass and a backward pass, and wherein during the forward pass each word of the query text has an intent score, and during the backward pass an intent loss is shared across all words of the query text.

16. The system of claim 14, wherein the neural network model includes a plurality of layers including the at least one layer comprising the plurality of loss functions, and wherein layers preceding the at least one layer include linear nodes.

17. The system of claim 14, wherein the intent classification loss function uses shared labels for each word included in the query text, the shared label being assigned to each word based on the query intent.

18. The system of claim 14, wherein the response to the query text includes information selected from among:
information about an item available to purchase;
information about a store identified as a named entity within the query text; or
information about gifting based on a determination of a gifting intent from the query text.

19. A retail search system comprising:
a web server hosting a retail website;
a query processing system communicatively connected to the web server to receive query text received at the web server from a hosted website, the query processing system including:
a neural network model having a plurality of layers, wherein at least one layer comprises a plurality of loss functions including a named entity tag learning loss function and an intent classification loss function;
an entity extraction component configured to receive query intents and identify one or more named entities from the query text; and
a response generation component configured to, based on the query intents and the one or more named entities, generate a response to the query text and provide the response to the web server.

20. The retail search system of claim 19, wherein the response generation component is communicatively coupled to a plurality of enterprise data stores including store data, product data, and order data, and the response includes information from at least one of the plurality of enterprise data stores based on the query intents and the one or more named entities.

* * * * *